(12) United States Patent
Hoermaier et al.

(10) Patent No.: US 11,108,499 B2
(45) Date of Patent: *Aug. 31, 2021

(54) SYSTEM AND METHOD FOR TRANSFERRING DATA AND A DATA CHECK FIELD

(71) Applicant: Infineon Technologies AG, Neubiberg (DE)

(72) Inventors: Klaus Hoermaier, Krumpendorf (AT); Jens Barrenscheen, Munich (DE); Christian Heiling, Graz (AT); Guenter Hofer, St. Oswald (AT)

(73) Assignee: INFINEON TECHNOLOGIES AG, Neubiberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/024,191

(22) Filed: Sep. 17, 2020

(65) Prior Publication Data

US 2021/0006353 A1   Jan. 7, 2021

Related U.S. Application Data

(63) Continuation of application No. 16/175,457, filed on Oct. 30, 2018, now Pat. No. 10,841,039.

(51) Int. Cl.
*G06F 11/00* (2006.01)
*H03M 13/00* (2006.01)
*H04L 1/00* (2006.01)

(52) U.S. Cl.
CPC .......... *H04L 1/0061* (2013.01); *H04L 1/0041* (2013.01)

(58) Field of Classification Search
CPC .......................... H04L 1/0061; H04L 1/0041
See application file for complete search history.

(56) References Cited

U.S. PATENT DOCUMENTS

| | | | |
|---|---|---|---|
| 6,018,526 | A | 1/2000 | Liu et al. |
| 7,702,822 | B2 | 4/2010 | Barrenscheen |
| 2009/0235113 | A1* | 9/2009 | Shaeffer ............. G06F 11/0703 714/5.11 |
| 2014/0025936 | A1 | 1/2014 | Morikawa |
| 2019/0065396 | A1 | 2/2019 | Troia |

* cited by examiner

*Primary Examiner* — Samir W Rizk
(74) *Attorney, Agent, or Firm* — Slater Matsil, LLP

(57) ABSTRACT

In accordance with an embodiment, a method of transferring data includes determining, by a first device, a data check field of a data frame based on a predetermined identification field and a plurality of data bits, wherein the predetermined identification field represents at least one of a content, source or target of the plurality of data bits; and transmitting, by the first device to a second device, the data frame comprising the plurality of data bits and the data check field without directly transmitting the predetermined identification field.

22 Claims, 10 Drawing Sheets

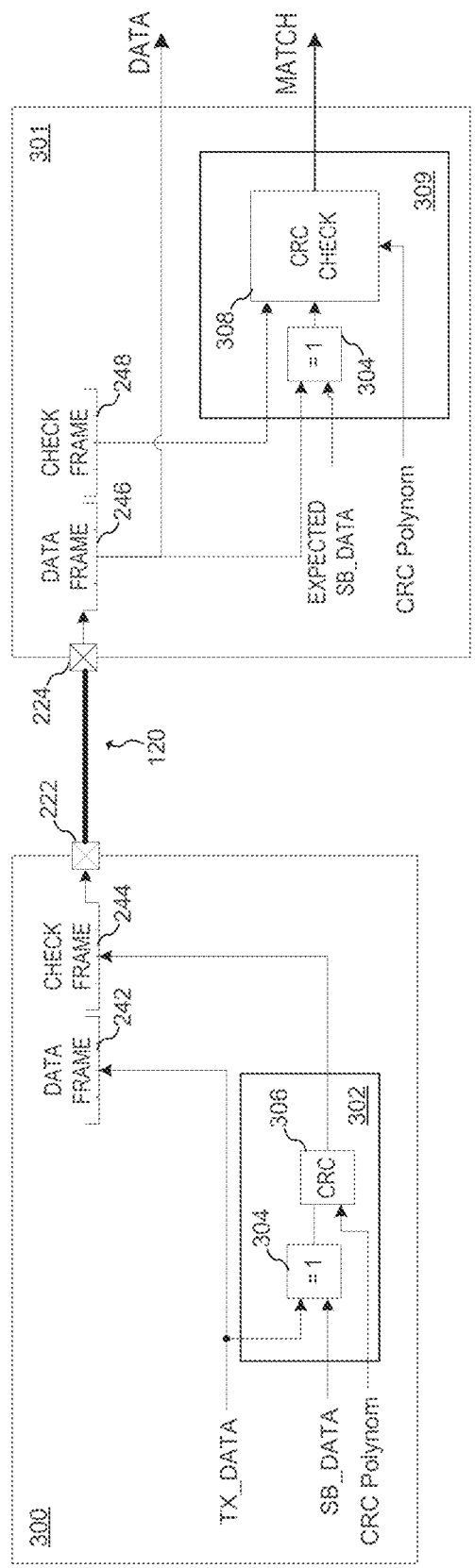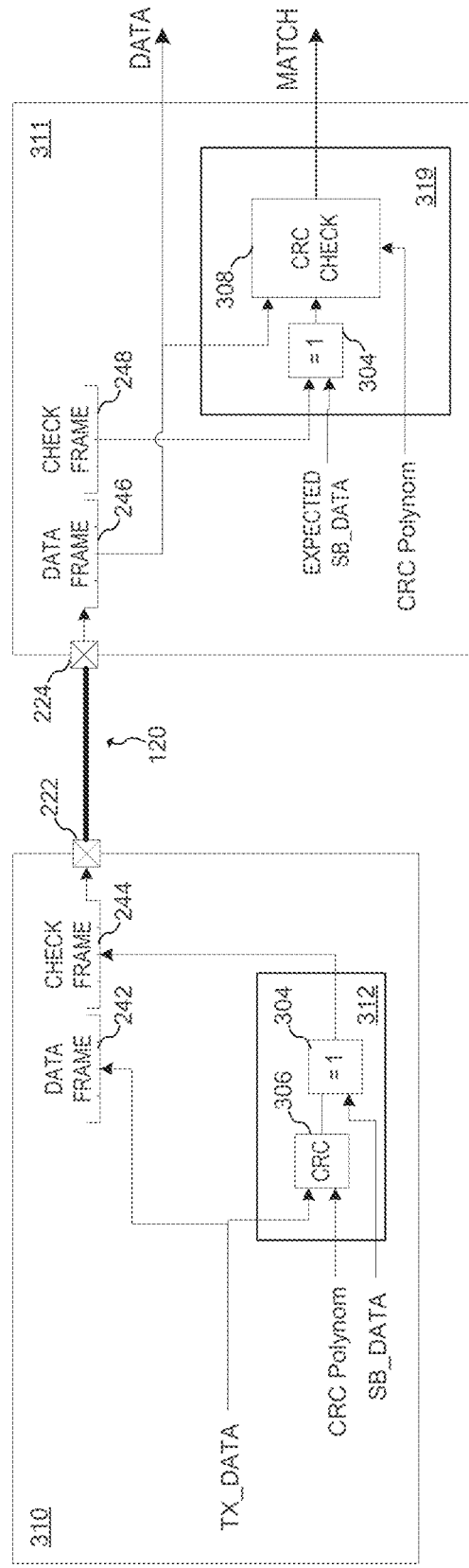
Fig. 3A
Fig. 3B

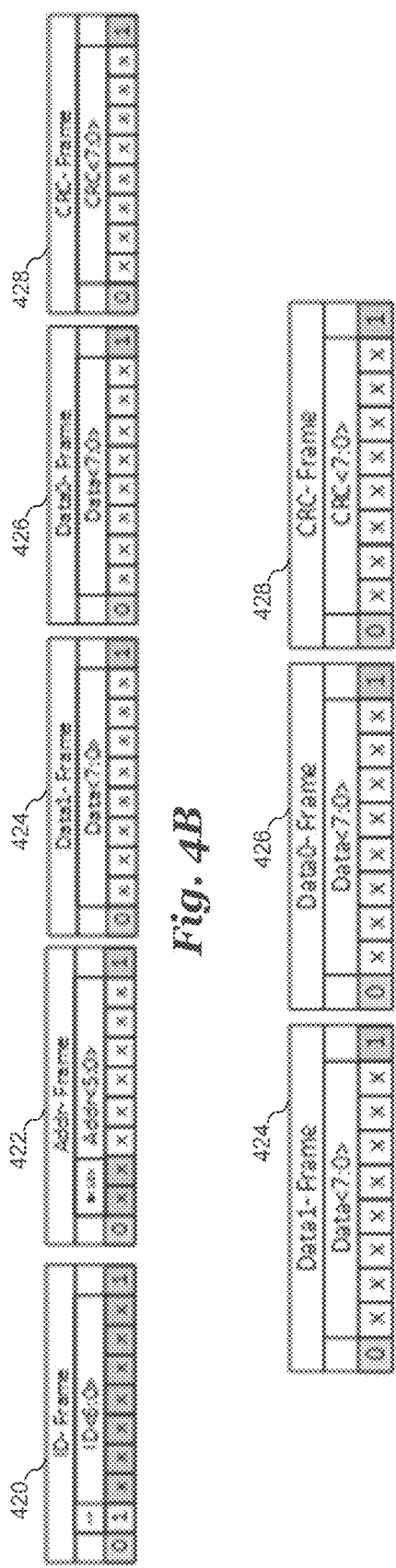
Fig. 4B
Fig. 4C
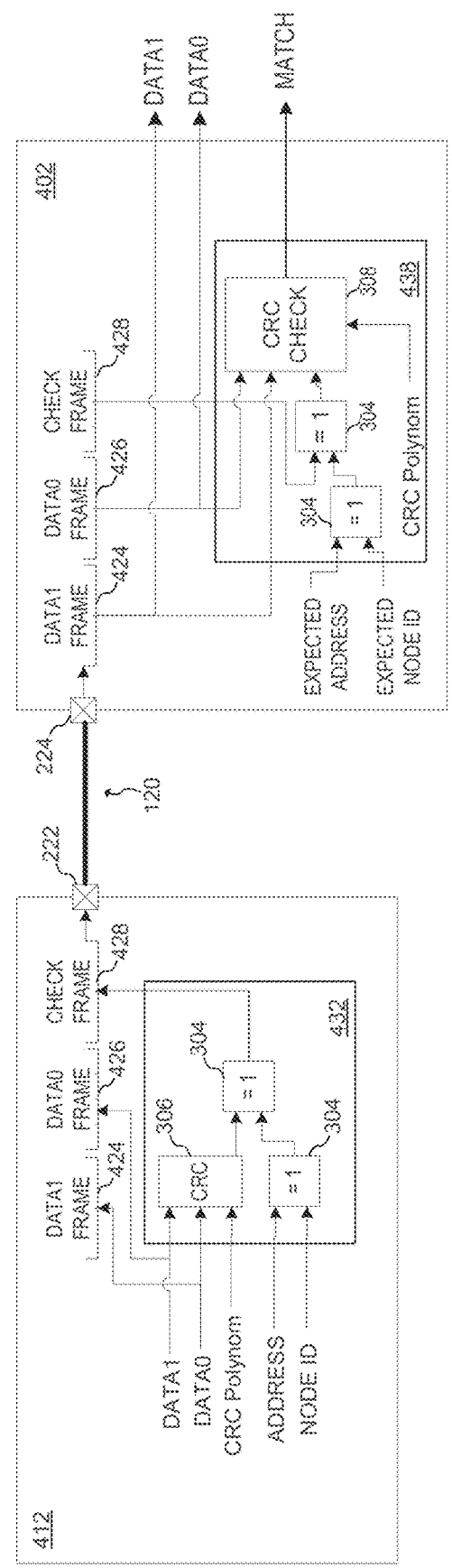
Fig. 4D

SYSTEM AND METHOD FOR TRANSFERRING DATA AND A DATA CHECK FIELD

This application is a continuation of U.S. patent application Ser. No. 16/175,457, filed Oct. 30, 2018, which application is hereby incorporated herein by reference in its entirety.

TECHNICAL FIELD

The present invention relates generally to a system and method for data transmission and, in particular embodiments, to a system and method for transferring data and a data check field.

BACKGROUND

Digital data buses and data links are ubiquitous in many electronic applications from desktop computers to automotive and manufacturing systems. Protocols such as serial peripheral interface (SPI), inter-integrated circuit (I2C), universal asynchronous receiver-transmitter (UART), and inter-block communications bus (IBCB) and other protocols are targeted toward a wide range of systems, while protocols such as local interconnect network (LIN), controller area network (CAN), and FlexRay have been developed to transfer automotive data such as engine control signals and automotive sensor signals.

For safety critical applications such as automotive systems, data integrity is a key factor in communication interfaces and data streams. Such systems may employ "end-to-end protection" in data streams to ensure that the same data content is received by the receiver that has been sent out by the transmitter. While safety critical data links may be designed to minimize errors in the data transfer, there may still be a remaining probability of data being corrupted during the transfer. Depending on the architecture of the transmitting and receiving devices, the data storage in the transmitter and in the receiver may also be covered by the end-to-end protection.

In some instances, end-to-end protection is achieved by adding overhead to the transmitted and received data communications. For example, a checksum may be appended to data frames to ensure that the data received on the data bus is error-free and uncorrupted. This checksum may include, for example, a parity or cyclic redundancy check (CRC) in addition to the raw data being transmitted and received. The transmitter or a unit delivering the raw data to the transmitter generates the checksum as a function of the raw data and transfers the results (both the raw data and the checksum) to the receiver. The receiver then checks if the received data matches to the checksum. If there is a match, the receiver assumes that the data has not been corrupted during the transfer (and/or the storage in the transmitter or receiver). If there is no match, the receiver assumes that data corruption has occurred and the data is discarded or corrected. For example, in systems in which the checksum method has error correction capabilities (such as error correcting codes), the error may be corrected. Some protocols such as LIN, CAN and universal serial bus (USB) incorporate a checksum according to their definition. When using protocols such as SPI and standard UART that do not directly incorporate a checksum, the handling and transfer of a checksum may be added according to the needs of the particular application.

End-to-end protection may be further enhanced by the transmission of acknowledgment frames or messages. For example, if a first node on the bus issues a read or write request to a second node on the bus, the second node may reply with an acknowledgement that includes the second node address and a checksum in addition to any requested data.

In systems having an appreciable amount of bus activity, the bus data rate may be increased and/or the bandwidth of the bus may be limited in order to support the additional overhead used to facilitate end-to-end protection.

SUMMARY

In accordance with an embodiment, a method of transferring data includes determining, by a first device, a data check field of a data frame based on a predetermined identification field and a plurality of data bits, wherein the predetermined identification field represents at least one of a content, source or target of the plurality of data bits; and transmitting, by the first device to a second device, the data frame comprising the plurality of data bits and the data check field without directly transmitting the predetermined identification field.

In accordance with another embodiment, a circuit configured to be coupled to a bus includes a first circuit configured to determine a data check field of a data frame based on a predetermined identification field and a plurality of data bits, where the predetermined identification field represents at least one of a content, source or target of the plurality of data bits; and a transmitter coupled to the first circuit and configured to be coupled to the bus and to transmit to a second circuit the data frame comprising the plurality of data bits and the data check field without directly transmitting the predetermined identification field.

In accordance with another embodiment, an integrated circuit includes a bus; a bus master circuit coupled to the bus; and a data storage circuit coupled to the bus, the data storage circuit including a data storage area, an address decoder, and a read checksum generator. The data storage circuit configured to receive a read address from the bus, decode, by the address decoder, the received read address to produce a decoded read address, access data from the data storage area based on the decoded read address, produce, by the read checksum generator, a read data check field based on the accessed data and the decoded read address, and transmit the read data check field on the bus without directly transmitting the decoded read address.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A-3C illustrate block diagrams of data links according to embodiments that show specific implementations of data check combiners and checksum checkers according to embodiments;

FIGS. 4B and 4C illustrate data frames associated with battery management systems; and FIG. 4D illustrates a block diagram of a data link according to an embodiment that is used to implement communication within a battery management system according to an embodiment;

Figure 1A:
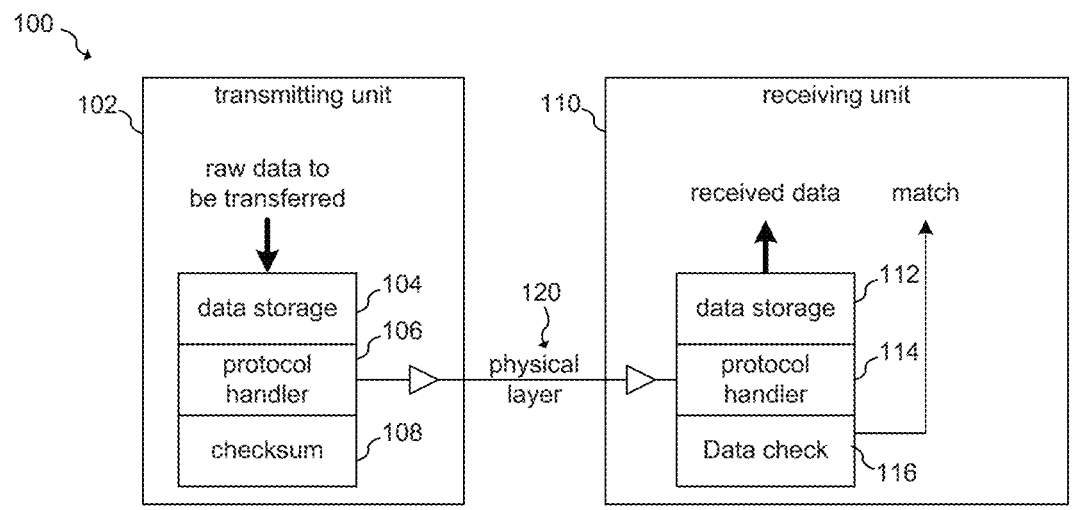
FIGS. 1A and 1B illustrate block diagrams of exemplary data links.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in specific contexts, such as systems and methods for transmitting data in a battery monitoring application, a SPI bus, and a bus master-based data transmission system. The invention, however, may also be applied to other types of data transmission systems.

In accordance with various embodiments, data overhead in data communications is reduced by encoding sideband information in the data check field of a data frame and transmitting the checksum field in lieu of the sideband information. This sideband information may include but is not limited to predetermined identification information that represents the content, the source or the target of bits or data that are transmitted. For example, with respect to a source of the bits or data that are transmitted, the predetermined sideband information may represent a device identifier or an address of the transmitting circuit, and/or may represent a read address that represents the location of the bits or data that are transmitted. With respect to a target of the bits or data that are transmitted, the predetermined sideband information may represent a device identifier or an address of the receiving circuit to which the bits or data are directed, and/or may represent a write address that represents the location to which the bits or data are to be written. Finally, with respect to the content of the transmitted bits or data, the sideband information may indicate and/or label what the transmitted bits or data represents. For example, in a sensor system, the sideband information may indicate that a transmitted data field represents a pressure, temperature speed or other sensor related parameter. It should be understood that the above-mentioned examples of sideband information representing a content, source or target are non-limiting examples.

Because the sideband information is not directly transmitted, the amount of overhead is reduced (e.g. a lower number of bits are transmitted than would have been transmitted if the sideband information were explicitly transmitted). For example, in the context of a master-slave communication system, a slave device may transmit data and a checksum in which the device identifier and/or device address is embedded. When the master device has a predetermined knowledge of the device identifier and/or address of the slave device, the master device may verify the checksum using the data and checksum received from the slave device along with a locally stored or determined version of the slave's device identifier and/or address. Such a situation may arise when there are a predetermined number of slave devices attached to the bus, when the slave devices are being polled via a predetermined schedule, when addresses in the slave device are read according to a predetermined sequence, and/or when the slave device is responding to a request for data from the master device. For example, in an automotive battery monitoring system, individual battery monitoring devices may be configured to provide battery measurement data to a controller in a predefined cycle. The omission of the device identifier field and/or address of the slave device may significantly reduce the traffic on the bus. Such a reduction of bus traffic may provide such benefits as allowing a greater number of slave devices attached to the bus, increasing the amount of data that can be transferred on the bus, and/or saving system power by allowing a reducing of bus clock frequency.

In another embodiment, the use of an embedded checksum may be used to verify the integrity of a remote read or write operation including the functionality of a remote address decoder. For example, during a read operation, the slave device may transmit a checksum in which the decoded address is included in the checksum along with the read data. The master device may verify both the integrity of the data and the decoded address by verifying the checksum according to the received data and the locally stored version of the expected decoded address. Similarly, the integrity of a write operation may be verified by the slave device by generating checksum based on written data and decoded address and comparing the generated checksum to a checksum received from the master device. The use of checksums generated by decoded addresses according to embodiments of the present invention provides an extra level of end-to-end protection and fault detection. Such a system may be configured to detect an error even in cases where the same "expected data" is read from the wrong address, e.g. due to an error in the address decoder or the data path to the address decoder. A similar structure may be applied to read addresses.

FIG. 1A illustrates an exemplary data link 100 that includes a transmitting unit 102 coupled to a receiving unit no. Data link 100 incorporates elements that are typical of common data communication systems. Transmitting unit 102 includes data storage 104, protocol handler 106 and checksum generator 108, while receiving unit no includes data storage 112, protocol handler 114 and data check block 116. Protocol handler 106 of transmitting unit 102 is coupled to protocol handler 114 of receiving unit no via physical layer 120.

During operation of data link 100, raw data is transferred into data storage 104 and a checksum is generated by checksum generator 108 based on the data to be transferred. Protocol handler 106 facilitates the transmission of the data and the checksum over physical layer 120 according to the specifications of the particular data communication protocol being used. The transmitted data and checksum is then received from physical layer 120 by protocol handler 114 of receiving unit no. The received data is stored in data storage 112 and data check block 116 determines whether the received data matches the received checksum.

Figure 1B:
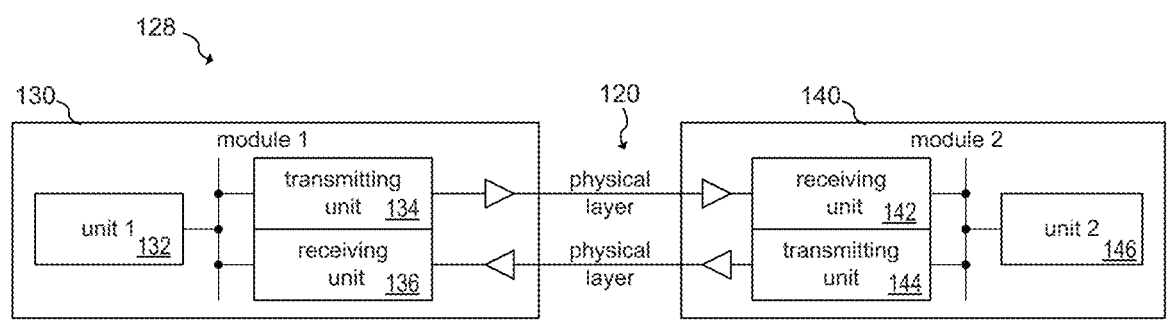

FIG. 1B illustrates an exemplary data link 128 in which data are transferred between first module 130 and second module 140 that are linked together via physical layer 120. Exemplary data link 128 may be representative of various embodiment data links described herein. As shown, first module 130 includes a first unit 132 coupled to transmitting unit 134 and receiving unit 136. Similarly, second module 140 includes a second unit 146 coupled to receiving unit 142 and transmitting unit 144. First unit 132 and second unit 146 may represent any system or subsystem between which data may be transferred and/or may represent subsystems capable of storing data and of managing the exchange of such data, transmitting units 134 and 144 represent subsystems capable of transmitting data and/or capable of managing the transmission of data, and receiving units 136 and 142 represent subsystems capable of transmitting data and/or capable of managing the reception of data.

First module 130 and second module 140 may be located in separate devices or in the same device. Thus, physical layer 120 may be implemented using one of number of physical layer protocols that are appropriate to the particular embodiment and its specifications. In some embodiments, first unit 132 of first module 130 may be configured to transfer data from second unit 146 of second module 140 via transmitting unit 134 and receiving unit 142. Upon reception of the transmitted data via physical layer 120, receiving unit 142 may trigger second unit 146 to take over the data in the case of a checksum match.

In various embodiments, the control mechanism to transfer data from first unit 132 to transmitting unit 134 in first module 130 or to transfer data from second unit 146 to transmitting unit 144 in second module 140 may be based on state machines or programmable units, such as a processor, microprocessor, central processing unit (CPU), or a direct memory access (DMA) controller.

During operation, first unit 132 and second unit 146 exchange data between each other in the form a frame. For the purpose of the present disclosure, a frame can be understood as at least one block of data and a checksum being transferred together from a transmitting unit 134 or 144 to a receiving unit 136 or 142.

In some systems, there may be some aspects of data that are generally transferred between entities that contain less information than a width its respective data field is capable of conveying. For example, only a small portion of an address space may be used in a particular system. A specific instance of this would be the case where first module 130 and/or second module 140 has a single address represented by a plurality of bits. Thus, in various embodiments of the present invention, portions of such data are not transferred directly, but are incorporated in the checksum field itself in order to reduce bandwidth for communication. In other words, the number of transmitted bits is reduced using embodiment systems and methods.

A typical example of this would be an answer frame from second module 140 to a read request from first module 130 to transfer data from second unit 146 to first unit 132 on the request of first module 130. In such a case, first module 130 sends a frame requesting specific data from second module 140. First module 130 indicates which data should be read by an identifier or a read address indication. Second module 140 receives the read request with the read address and delivers the requested data to first module 130 as answer frame.

There may be embodiments where the read address is not transferred back from second module 140 to first module 130. However, in many safety-critical applications the read address is transferred in order to verify correct system operation. For example, in a system where first module 130 issues a sequence of read requests from different addresses to second module 140, second module 140 may be configured to send back the requested data to first module 130. If both sequences always match, there is no risk in omitting second module 140 not sending the read address back to first module 130. However, in the case where it cannot be ensured that the sequences match (e.g. if a read request or a reply frame is discarded due to data corruption during the transfer), it is advantageous to hand over the address from where the data has been read inside second module 140 back to first module 130 in order to facilitate error detection.

The transfer of such addresses is also advantageous for ensuring the integrity of the received address in second module 140. The probability that the address received by second module 140 gets corrupted between the reception in the receiving unit and its application to second unit 146 in non-ideal or noisy environments is not zero. Such corruption of data can be due to many sources from noise or disturbances affecting the communication channel of physical layer 120 to a defect in the device hardware itself, such as a malfunction of the address decoder in second module 140 or second unit 146.

Delivering correct data with a correct checksum, but from a wrong address may be problematic for safety-critical applications because of the difficulty involved in first module 130 detecting such errors. Therefore, in some embodiments, data may be discarded when data is received from an incorrect address.

In the case of a read request from first module 130 to one specific address in second module 140, assuming that second module 140 sends back the read back to first module 130, there is really only one "correct" expected address and n−1 "incorrect" addresses that could be received by first module 130, where n is the number of possible values in the received address field. Since it is not necessary to know which one of the n−1 wrong incorrect values is actually received by first module 130, a simple pass/fail decision can be made.

According to various embodiments, second module 140 does not need to explicitly transmit the read address if the read address is embedded in the generated checksum generation (e.g. in the CRC) together with the data. Since the first module 130 initiated the read request, the first module 130 "knows" the expected value of the read address. Accordingly, this expected value of the read address may be used by first module 130 for checksum handling and the match generation.

In addition to the specific example of a data read access given above, there are more scenarios where a limited number of expected values could be found. In topologies where several independent devices or modules may deliver data to a master device, the device identifier may be considered as expected value. Here, the master device may be configured to deal with number of expected values.

Figure 2A:
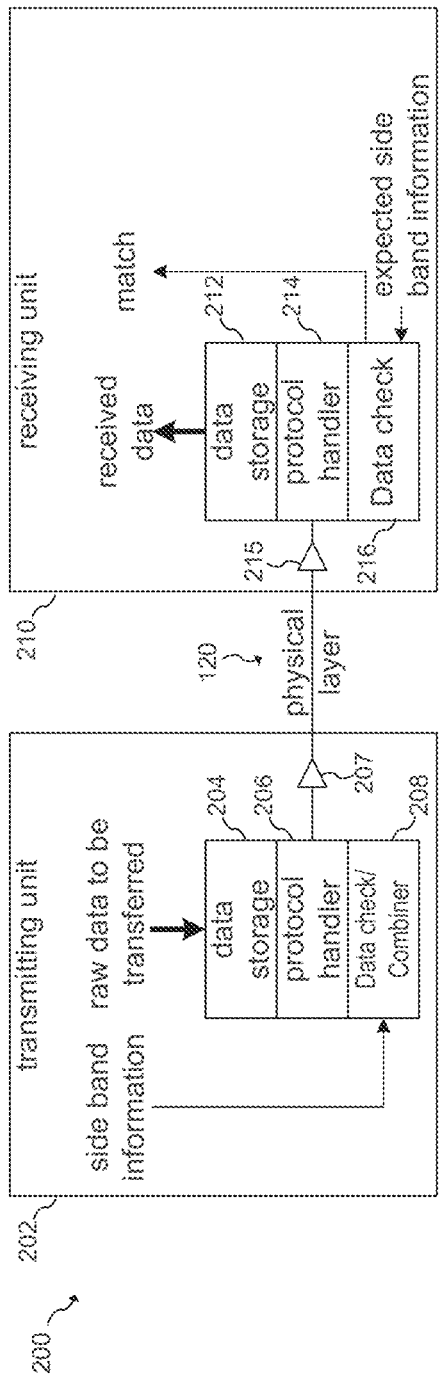
FIGS. 2A and 2B illustrate block diagrams of data links according to embodiments.

FIG. 2A illustrates data link 200 according to an embodiment of the present invention. Transmitting unit 202 includes data storage 204, protocol handler 206 and embodiment checksum combiner 208, while receiving unit 110 includes data storage 212, protocol handler 214 and checksum checker 216. Protocol handler 206 of transmitting unit 202 is coupled to protocol handler 214 of receiving unit 210 via physical layer 120.

During operation of data link 200, raw data is transferred into data storage 104 and a checksum is generated by data check combiner 208 based on the data to be transferred as well as on sideband information. In various embodiments, this sideband information is information that is known a priori by receiving unit 210. Examples of side band information include, but are not limited to predetermined addresses, device identifiers and decoded address fields as is explained below with respect to various embodiments. Accordingly, the checksum generated by data check combiner 208 has the sideband data embedded within it.

Protocol handler 206 and physical layer interface facilitates the transmission of the data and the checksum over physical layer 120 according to the specifications of the particular data communication protocol being used. However, the side band information that is embedded within the checksum is not explicitly transmitted. The transmitted data and checksum is then received from physical layer 120 by physical layer interface 215 protocol handler 214 of receiving unit 210. The received data is stored in data storage 212 and checksum checker 216 determines whether the received data and the expected sideband information match the received checksum.

Data storage 204 and 212 may include, but is not limited to any type of writable system memory such as random access memory (RAM), static RAM (SRAM), dynamic RAM (DRAM), synchronous DRAM (SDRAM), electrically erasable programmable read only memory (EE-PROM), or a combination thereof. Protocol handlers 206 and 214, data check combiner 208 and checksum checker 216 may be implemented using digital circuits and systems known in the art. For example, these functions may be implemented using custom digital logic, standard cell digital logic, and/or may be implemented in software running on a processor, microcontroller or digital signal processor. Such processors may include, for example, a processor core, and memory coupled to the processor core and one or more input/output ports. Alternatively, other circuits and systems known in the art may be used to implement these functions. Physical layer interfaces 207 and 215 may be implemented using appropriate data transmission circuitry known in the art that is adapted to the particular physical layer channel/technology and the data communication protocol being used. Such circuitry may include, but is not limited to line drivers, line receivers, amplifiers, RF interface circuitry, optical transmitters and receivers.

Figure 2B:
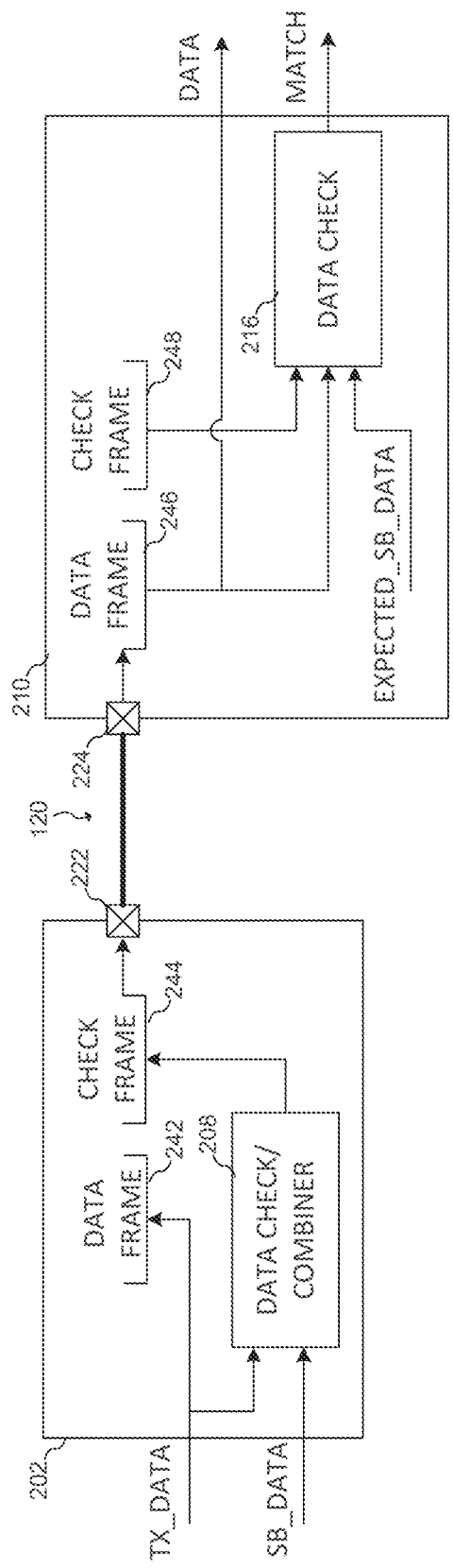

FIG. 2B illustrates a block diagram showing the functional relationship among data check combiner 208 of transmitting unit 202, checksum checker 216 of receiving unit 210, and the various transmitted and received data fields. In some embodiments, communication interface 222 of transmitting unit 202 may be representative of the functionality of protocol handler 206 and physical layer interface 207 and communications interface 224 of receiving unit 210 represents the functionality of protocol handler 214 and physical layer interface 215 shown in FIG. 2A.

During operation, transmitted data TX_DATA is transferred into transmitted data frame 242, while transmitted check frame 244 is generated using data check combiner 208 based on transmitted data TX_DATA and sideband data SB_DATA. Transmitted data frame 242 and transmitted check frame 244 are transmitted to physical layer 120 via communication interface 222. In embodiments of the present invention, sideband data SB_DATA is not explicitly transmitted. Thus number of transmitted bits including data frame 242 and check frame 244 is less than the number of bit that would be transmitted all of data frame 242, check frame 244 and sideband data SB_DATA would be transmitted.

The transmitted data are received by communication interface 224 of receiving unit 210 as received data frame 246 and received check frame 248. Checksum checker 216 determines the integrity of received data frame 246 based on received check frame 248 and expected side band data EXPECTED_SB_DATA.

FIGS. 3A and 3B illustrate specific implementations of embodiment data links in which various implementations of data check combiner 208 and checksum checker 216 are made explicit. For example, FIG. 3A illustrates transmitting unit 300 coupled to receiving unit 301. As shown, transmit data TX_DATA is loaded directly into transmitted data frame 242, while transmitted check frame 244 is populated with data generated by data check combiner 302, which includes a bitwise exclusive-OR block 304 followed by data check combiner CRC generator 306. During operation, exclusive-OR block 304 performs an exclusive-OR operation with at least a part of the transmit data TX_DATA and sideband information SB_DATA to produce a first data value. The transmitted check frame 244 is then generated using CRC generator 306 based on the first data value by a CRC polynomial.

After transmission over physical layer 120, received data frame 246, which may include transmitted data TX_DATA, is considered to be the received data field DATA. Checksum checker 309 verifies the integrity of the received data frame 246 with respect to received check frame 248 by performing an exclusive-OR operation using exclusive-OR block 304 with a locally derived version of the expected sideband data EXPECTED SB_DATA and at least a part of the received data frame 246. A CRC check is performed on the exclusive-ORed data with respect to received check frame 248 and the CRC polynomial using CRC checker 308. The checksum checker 309 indicates whether or not received data frame 246 matches the received check frame 248 and the locally stored expected sideband data EXPECTED SB_DATA. The indication of a match by checksum checker 309 is an indication that there is no error in received data frame 246 and that the side band data intended by transmitting unit 300 matches the expected sideband data EXPECTED SB_DATA.

FIG. 3B illustrates transmitting unit 310 coupled to receiving unit 311. The implementation of FIG. 3B is similar to the implementation of FIG. 3A with the exception that data check combiner 312 performs a CRC operation on transmit data TX_DATA prior to an exclusive-OR operation with sideband data SB_DATA prior to transmission on physical layer 120. Thus, in order to determine whether received data frame 246 matches received check frame 248 and the expected sideband data EXPECTED SB_DATA, checksum checker 319 first performs an exclusive-OR operation on received check frame 248 and expected sideband data EXPECTED SB_DATA (instead of between received data frame 246 and expected sideband data EXPECTED SB_DATA as was the case in FIG. 3A). A CRC check is performed on the exclusive-ORed value using CRC checker 308 to determine whether received data frame 246 is valid and embedded sideband data matches expected sideband data EXPECTED SB_DATA.

Figure 3C:
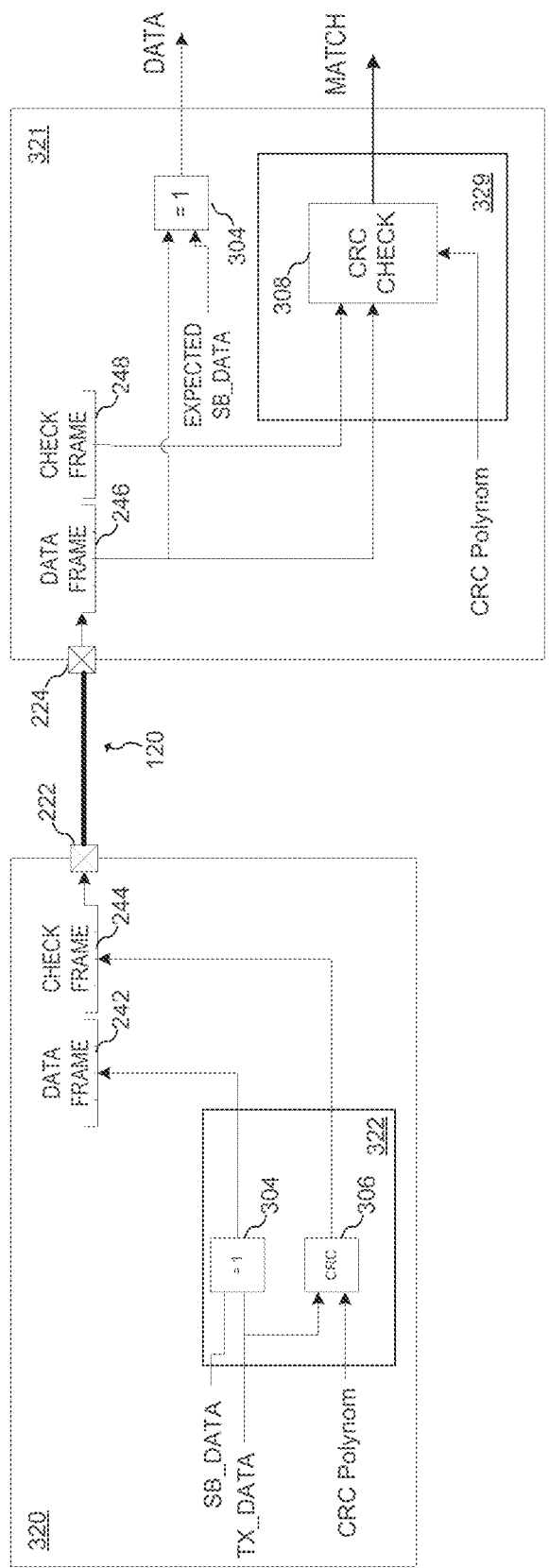

FIG. 3C illustrates transmitting unit 320 coupled to receiving unit 321. The implementation of FIG. 3C is different from the implementations of FIGS. 3A and 3B in that the sideband data SB_DATA is embedded in transmitted data frame 242 instead of in transmitted check frame 244. As shown, exclusive-OR block 304 in data check combiner 322 performs an exclusive-OR between at least a part of the transmitted data TX_DATA and the sideband data SB_DATA. The result of this exclusive-OR operation is loaded into transmitted data frame 242. CRC generator 306 produces transmitted check frame 244 based on transmitted data TX_DATA and a CRC polynomial. After transmitted data frame 242 and transmitted check frame 244 are transmitted over physical layer 120, CRC checker 308 in checksum checker 329 performs a CRC check on received data frame 246 with respect to received check frame 248 and the CRC polynomial. This verifies that received data frame 246 (which is an exclusive-ORed version of transmit data TX_DATA and the embedded sideband information) matches received check frame 248. The received data DATA is derived by performing an exclusive-OR operation between the received data frame 246 and the expected sideband data EXPECTED_SB_DATA.

It should be understood that the embodiments of FIGS. 3A-3C are just three examples of many ways in which sideband data could be embedded in transmitted data frames without being explicitly transmitted in a manner in which both the validity of then transmitted data and the embedded sideband data is verified. In alternative embodiments of the present invention, the bitwise exclusive-OR operation performed by exclusive-OR block 304 could be replaced by another reversible digital operation. In addition, the CRC operations performed by CRC generator 306 and CRC checker 308 could be replaced by other data check operations such hash functions.

Figure 4A:
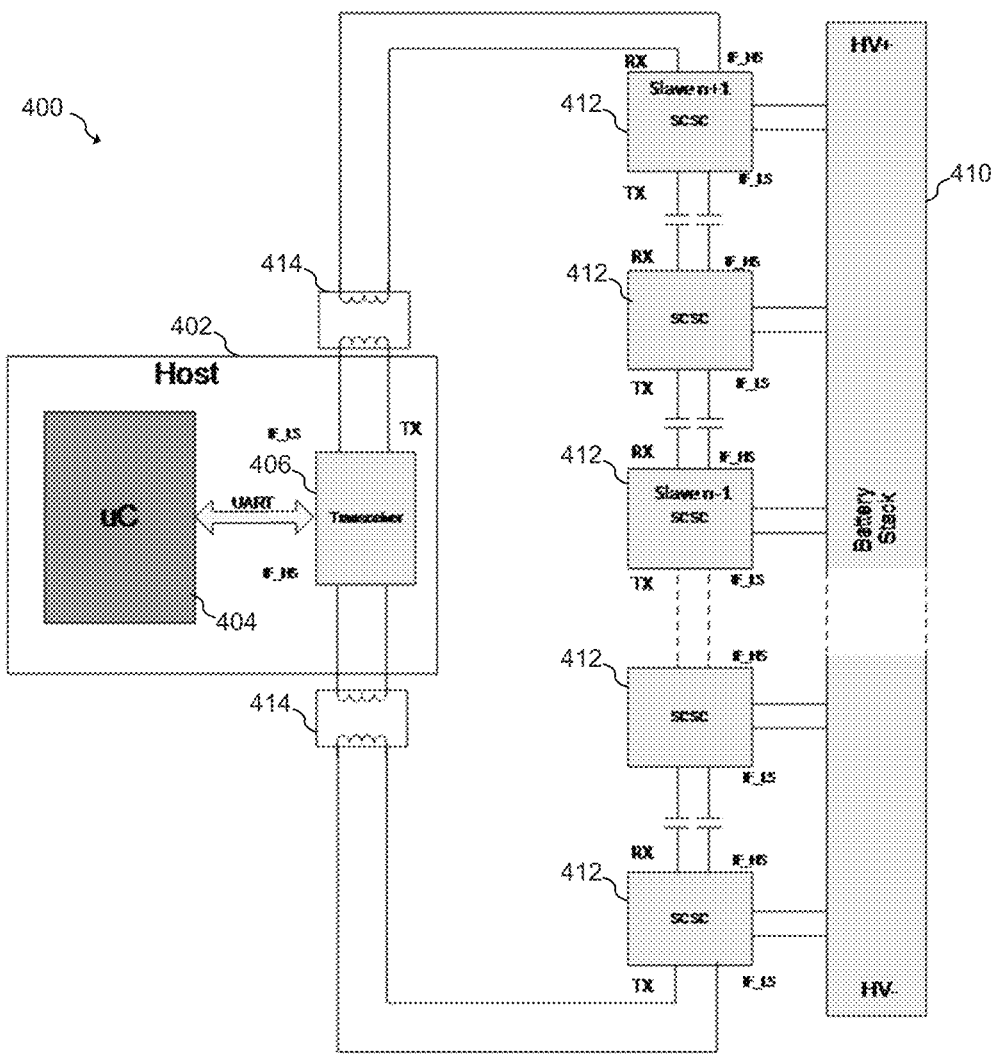
FIG. 4A illustrates a block diagram of a battery management system according to an embodiment.

FIG. 4A illustrates a battery management system 400 that is configured to implement embodiment data transmission systems and methods. In battery management system 400 a number of battery sensing ICs 412 are connected to a corresponding number of battery cells in battery stack 410. As shown, the communication ports of battery sensing ICs 412 are daisy chained together and connected to battery management host controller 402 via isolating elements, such as transformers 414. Battery management host controller 402 is shown to include transceiver 406 coupled to microcontroller 404 via a UART interface; however, other architectures are possible for battery management host controller 402. In some embodiments, the number of battery sensing ICs 412 can be very large. For example, for a 400 V battery stack up to no battery sensing ICs 412 could be used, and for an 800 V battery stack up to 220 battery sensing ICs 412 could be used. During operation, data communication may proceed in a half-duplex manner. Battery management host controller 402 sends requests to battery sensing ICs 412. In response, the battery sensing IC 412 replies with battery measurement data that is stored in the registers of battery sensing ICs 412. In the host controller, it may be useful to know which data belongs to which battery sensing IC. Therefore, unique device/node identifiers or device addresses are introduced for each sensing IC according to some embodiments. A sensing IC may contain several data registers with data that may be requested by the host controller by a read request. To identify which data has been sent to the host controller by which sensing IC, information is included about the sending device and the data source into the data frame.

When battery management system 400 is implemented in a safety critical application such as an electric car, the data transmitted and received between battery sensing ICs 412 and battery management host controller 402 constitute safety critical data. Thus, in many battery management systems, data verification techniques are used to ensure the validity of the exchanged data. In conventional battery management systems, a node ID (representing the identify of a particular battery sensing IC 412) and register address (representing a particular address within battery sensing IC 412) is transmitted from the battery sensing IC 412 to the battery management host controller 402 in a replay frame in addition to the transferred battery sensing data. Adding this information requires additional bits in the reply frame, which may reduce the useful bandwidth of the communication channel. Thus, reading out one voltage measurement result for all nodes can take 3 ms for a 400 V battery and 6 ms for an 800 V battery. The amount of data traffic required can, therefore, limit the number of battery sensing ICs 412 and/or limit the number of possible measurements within a predetermined period. For example, because it takes 6 ms to read back all of the data from battery sensing ICs 412, there is only enough time to read back a single measurement per battery sensing IC 412 in a 10 ms measurement cycle.

FIG. 4B illustrates an example frame structure of a reply frame for a conventional battery management system. As shown, the reply frame includes ID frame 420 that includes the device or node ID of the battery sensing IC, address frame 422 includes the register address of battery sensing IC, data frames 424 and 426 include the data being read from the battery sending IC, and check frame 428 includes a checksum used to verify the frames 420, 422, 424 and 426.

FIG. 4C illustrates a frame structure of a reply frame for an embodiment of the present invention. As shown, embodiment reply frame includes data frames 424 and 426 and check frame 428. Since the device or node ID and address are embedded in data check frame 428, these data are not explicitly sent. Therefore, in embodiments of the present invention, the amount of bus traffic can be reduced by 40% in this specific example. For a system having 220 battery sensing ICs 412, the amount of time needed to transmit measurements from all battery sensing ICs 412 can be reduced from about 6 ms to about 3.7 ms. It should be understood that this amount of bus traffic reduction is just one example of bus traffic reduction for a specific embodiment. In alternative embodiments, a greater or lesser amount of bus traffic reduction may be achievable depending on the particular embodiment and its specifications.

During operation, battery management host controller 402 issues read requests to each of the battery sensing ICs 412. Each battery sensing IC 412 responds to the read request with the requested data and a checksum, such that the device or node ID and register address is embedded in the checksum and/or the requested data. The battery management host controller 402 then verifies the received data with respect to the received data and a locally stored value of the expected device ID and register address. To operate such a system, the host controller initiates the read requests and locally stores the information about the requested device or node ID and the register address as expected values. These expected values may be used to check for data integrity and integrity of the sequence of data frames when receiving future data frames.

FIG. 4D illustrates a specific implementation of an embodiment data link that could be used to implement the communication between battery sensing IC 412 and battery management host controller 402. As shown, battery sensing IC 412 includes an embodiment data check combiner 432 and battery management host controller 402 includes an embodiment checksum checker 438. CRC generator 306 in data check combiner 432 performs generates a CRC checksum based on first data frame 424 and second data frame 426 and a CRC polynomial. The node ID of the particular battery sensing IC 412 is exclusive-ORed with the register address, the result of which exclusive-ORed with the generated CRC checksum to create a modified checksum. This modified checksum is then used as the transmitted data check frame 428.

After the data frames are transmitted over physical layer 120, CRC checker 308 performs a CRC check on first data frame 424, second data frame 426 and an exclusive-ORed combination of data check frame 428, the expected address and the expected node ID based on a CRC polynomial. If first data frame 424, second data frame 426, expected node ID and the expected address match data check frame 428, then the received first data frame 424 and second data frame 426 are considered valid. If the CRC checker indicates that the received first data frame 424 and second data frame 426 are invalid, then battery management host controller 402 discards first data frame 424 and second data frame 426. In alternative embodiments of the present invention, the bitwise exclusive-OR operation performed by exclusive-OR block 304 could be replaced by another operation including, but not limited to a left shift, right shift, OR, AND, NAND, addition, subtraction, multiplication, division, cross-sum, a modulo operation, or any function that transforms or maps a symbol space to another symbol space with a unique mapping can be used. In some embodiments, the operation is a reversible operation. In addition, the CRC operations performed by CRC generator 306 and CRC checker 308, as well as other CRC operations described herein, could be replaced by other hash functions known in the art.

Each battery sensing IC has its own device or node ID, which is unique in the system. The device or node ID that is incorporated in the checksum generated by the host controller may be checked in each sensing IC against the "own" local device or node ID of each sensing IC as expected value. As a result, each sensing IC may detect if it is targeted by the host controller, e.g. to execute a write or a read action. If there is no match found, the sensing IC may discard the received request from the host. In case of a match, the received request may be processed further in the battery sensing IC and may lead to a reply frame.

It should be understood that the implementation of data check combiner 432 of battery sensing IC 412 and corresponding checksum checker 438 of battery management host controller 402 is just one of many example implementations. In alternative embodiments of the present invention, other implementations are possible. For example, the embodiment implementations of the data check combiners and corresponding checksum checkers illustrated in FIGS. 3A-3C may be used to implement data check combiner 432 and checksum checker 438.

Figure 5A:
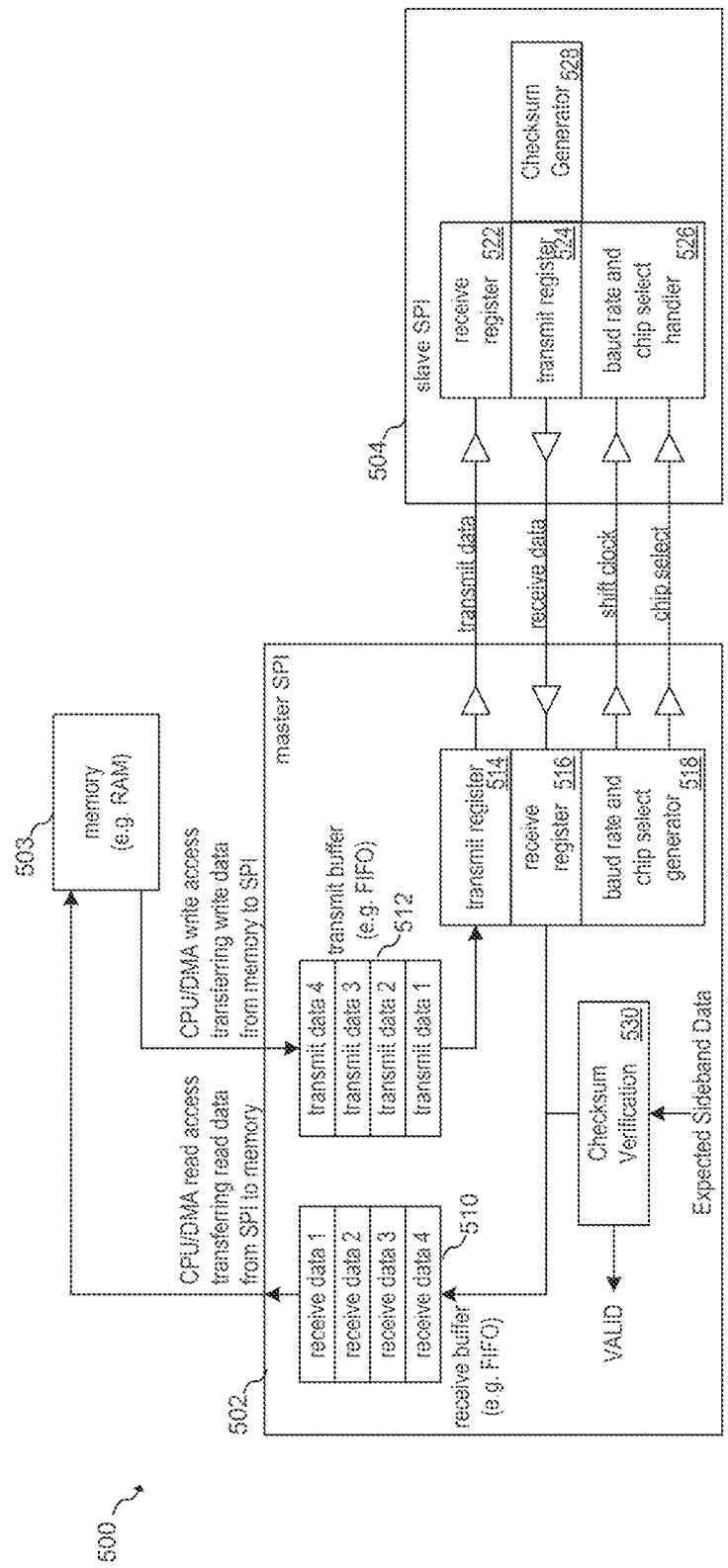
FIG. 5A illustrates a block diagram of a SPI bus system according to an embodiment.

While above-describe battery management system 400 utilizes embodiment data communications systems and methods for half-duplex communications. Embodiment systems and method can also be applied to systems that utilize full-duplex communications, such as data communications over an SPI bus. FIG. 5A illustrates a block diagram of an embodiment SPI bus system 500 that utilizes embodiment systems and methods of embedding sideband information in data transmissions. As shown, SPI bus system 500 includes a master SPI device 502 coupled to at least one slave SPI device 504 over a bus that includes a transmit data line, a receive data line, a shift clock lines and a chip select line. In the illustrated embodiment, memory 503 is coupled to master SPI device 502 so that data can be transferred to and from master SPI device 502 using, for example, CPU controlled direct memory access (DMA) systems and methods known in the art.

As shown, master SPI device 502 includes transmit register 514 coupled to the transmit data line, receive register 516 coupled to the receive data line, and a baud rate and chip select generator 518 coupled to the shift clock and the chip select line. Baud rate and chip select generator 518 may be designed, for example, to implement and facilitate SPI data transfers using SPI systems and methods known in the art. Transmit buffer 512 is coupled to transmit register 514 such that data in transmit buffer 512 is transmitted over the transmit data line via transmit register 514, and receive buffer 510 is coupled to receive register 516 such that data received from the receive data line is transferred to receive buffer 510. Checksum verification block 530 verifies the validity of the data received from the receive data line using embodiment systems and methods described herein. In some embodiments, checksum verification block 530 may be implemented using embodiment checksum checkers disclosed and described hereinabove with respect to FIGS. 2B and 3A-3C.

Slave SPI device 504 includes receive register 522 coupled to the transmit data line, transmit register 524 coupled to the receive data line, and baud rate and chip select handler 526 coupled to the shift clock line and to the chip select line. Baud rate and chip select handler 526 may be designed, for example, to implement and facilitate SPI data transfers using SPI systems and methods known in the art. Checksum generator 528 may be configured to generate checksums with embedded sideband information according to embodiments of the present invention. For example, in some embodiments, checksum generator 528 may be implemented using embodiment data check combiners disclosed and described hereinabove with respect to FIGS. 3A-3C.

For full-duplex SPI data transfers, a transmit data word (data from master SPI device 502 to slave SPI device 504) and a receive data word (data from slave SPI device 504 to master SPI device 502) may be transferred in parallel. A transmit data word may include data that is intended to be stored in slave SPI device 504 at an address that is indicated by a write address included in the transmit data word (or a formerly transmitted data word). A transmit data word may also include a read request indicating from which address in slave SPI device 504 (or which particular slave device for embodiments that include multiple slave devices) master SPI device 502 device wants to read data. The read data is transferred to master SPI device 502 with an SPI transfer that follows the read request. This may occur in the immediately following SPI transfer, or in a later SPI transfer.

The transmit data words may be stored (one after the other) in transmit buffer 512 to decouple the timing constraints between CPU/DMA accesses and the SPI transfers (e.g. the CPU can set up a sequence of transmit data words in the buffer and the SPI transfers them one after the other without any further CPU action). A similar transfer method may be used for read data storage in receive buffer 510 such that master SPI device 502 stores the received data one after the other in receive buffer 510 such that the CPU/DMA can access the received data as needed.

As an example of the operation of SPI bus system 500, a sequence of four read requests is stored in transmit buffer 512 and sent to slave SPI device 504 via transmit register 514 and the transmit data line. For safety and verification reasons, these data transfers are end-to-end protected (e.g. by a checksum included in a transmit data word). Slave SPI device 504 may be configured to verify the transmitted data using the checksum and to discard the transmitted data if the checksum does not match.

Assuming that the first read request is correctly received and answered by slave SPI device 504, the transfer of the first read request leads to a first frame of receive data to be stored in the master device because SPI bus system 500 operates using full-duplex operation. However, this first frame of received data may be related to a formerly transferred transmit data word or read request. Thus, the read data requested by first request may be received in the second frame of receive data in receive buffer 510 of master SPI device 502 at the same time that master SPI device 502 issues a second read request.

In the event that the second read request is incorrectly received by slave SPI device 504 and the incorrect reception is detected by slave SPI device 504 (e.g. the checksum does not match read request), then slave SPI device 504 does not transfer the requested data. Rather, slave SPI device 504 may send a message to master SPI device 502 indicating that the received request was not valid. Assuming that one data transfer of received SPI data from receive buffer 510 is found corrupted and discarded (data will not arrive in memory 503) and that subsequent data transfers are executed correctly, there will be one read data set missing in the memory.

If a higher-level software looks at the read requests in memory 503 (here, the read addresses are still visible) and the later received answers (here, the read addresses may not be visible anymore, because they have not been transferred back to the master device), a fatal misinterpretation may happen if the software does not identify which read data is missing in memory 503.

Thus, in accordance with embodiments of the present invention, the expected values for the read addresses can be easily found out by looking at the read requests stored in memory. A set of read data and read checksum may be checked against the expected value to ensure that the SW finds the correct answer data to a read request and does not interpret read data belonging to another read request. Thus, in embodiments of the invention, a situation in which the software interprets data read from register X as emanating from register Y can be avoided.

According to many embodiments, the software interprets the data stored in memory 503 and not the data in the local buffers of such as receive buffer 510 and 512, as these buffers are generally used to store data temporarily and have a limited size. Move operations (either by CPU or DMA=direct memory access, that can be easily triggered by receive/transmit events of a communication interface or a timer) transfer the data between receive buffer 510 and memory 503 and between transmit buffer 512 and memory 503. In many cases, the software is executed in time slots (coordinated by a real-time operating system=RTOS) and is time-wise decoupled from the timings of the data transfers.

In embodiments of the present invention, the address of slave SPI device 504 and/or the message indicating that a transmission error has occurred may be embedded into the check data field using embodiment systems and methods. Such embodiment methods are especially advantageous if the SPI word transferred from slave SPI device 504 to master SPI device 502 does not have enough bits to transmit the error indication and the address and the data. If only the data bits can be transferred, the CRC checksum over the requested read address may be used to differentiate between a correctly handled read request and an error indication. If an error code is included in the CRC handling instead of the requested address, then the error code is also an expected value and may be interpreted by the master device.

Figure 5B:
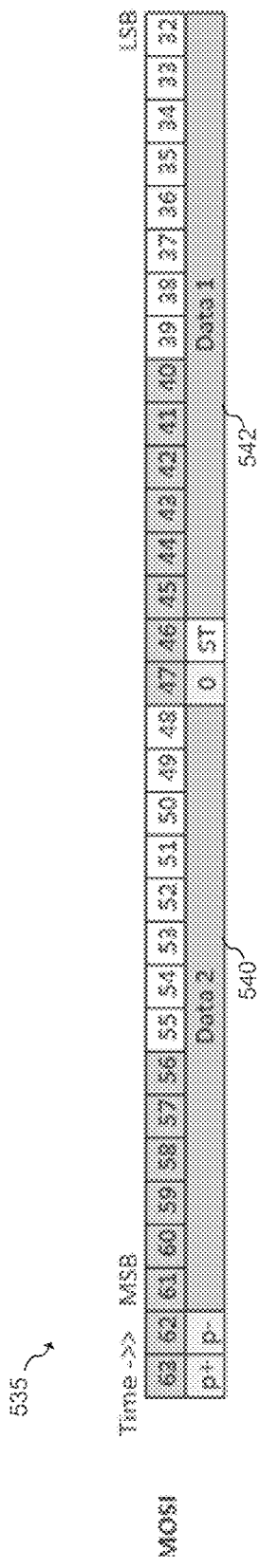
FIGS. 5B and 5C illustrate data frames associated with SPI bus systems according to embodiments.
Figure 5B:
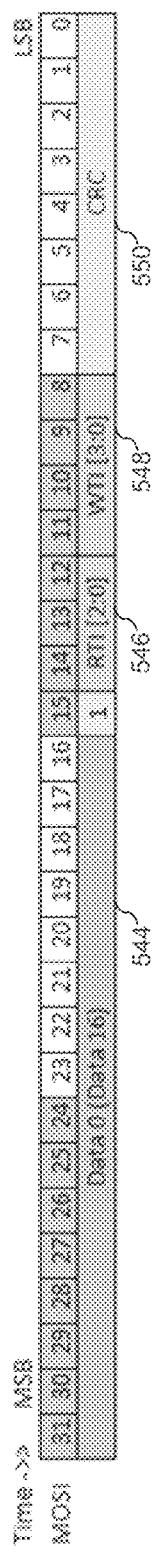
Figure 5C:
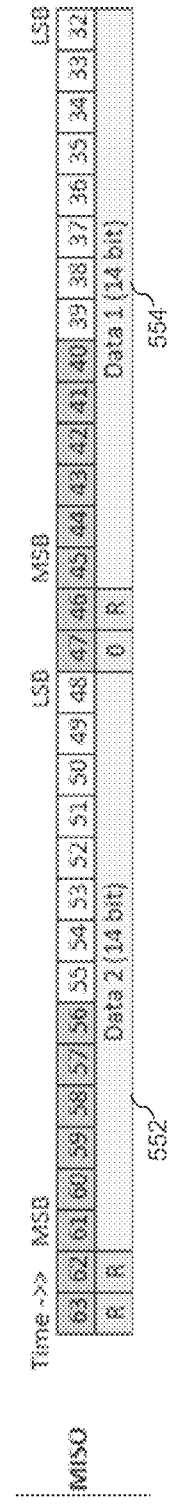
Figure 5C:
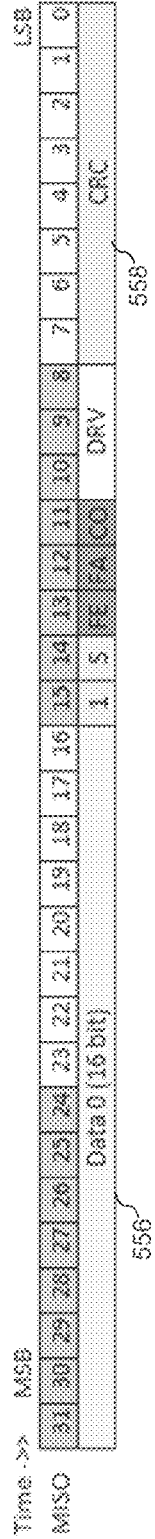

FIGS. 5B and 5C illustrate example data frames that can be exchanged between master SPI device 502 and slave SPI device 504. These data frames operate according to an SPI protocol with 32 bits per SPI word and 2 SPI words per data frame. However, other frame types could be used in alternative embodiments. FIG. 5B illustrates a data frame 535 that can be transferred from master SPI device 502 to slave SPI device 504. As shown data frame 535 includes 64 bits that comprise a first write data word 540, a second write data word 542, a third write data word 544, a read type indicator 546, a write type indicator 548 and a CRC 550.

In various embodiments, read type indicator 546 is used to by master SPI device 502 to request read data from slave SPI device 504, while write type indicator 548 is used by master SPI device 502 to write data to slave SPI device 504. For example, when master SPI device 502 requests read data, the appropriate read request is encoded in the read type indicator 546 and transmitted to slave SPI device 504. On the other hand, when master SPI device 502 requests that data be written to master SPI device 502, an appropriate write request is encoded in write type indicator 548 and the data to be written is placed in first write data word 540, second write data word 542 and/or third write data word 544 as necessary. Before transmission, CRC 550 is generated to according to bits 8-63 in data frame 535. In some embodiments, the write type indicator can be interpreted as write request to a given write address or set of write addresses, whereas the read indicator can be seen as a read request from a given read address or set of read addresses. The given address(es) may be comprised in the indicators.

FIG. 5C illustrates data frame 560 that can be transferred from slave SPI device 504 to master SPI device 502. As shown, data frame 560 includes first read data word 552, second read data word 554, third read data word 556 which may include, for example, data requested by master SPI device 502. Data frame 560 also includes CRC 558 that is generated by checksum generator 528 based on bits 8-63 in data frame 560 as well as additional sideband information according to embodiments of the present invention. Such sideband information may include, for example, the contents of read type indicator 546 and/or write type indicator 548 received by slave SPI device 504 in a previous frame. This side band information may be encoded in CRC 558 using any embodiment sideband data embedding system and method described herein. When data frame 560 is received by master SPI device 502, the data is verified by checksum verification block 530 according using CRC 558 and the previously transmitted (and therefore locally stored) read type indicator 546 and write type indicator 548 according to embodiment systems and methods described above. In embodiments where there is more than one possible expected value for read type indicator 546 and/or write type indicator 548 (e.g. in cases where there is more than one register in slave SPI device 504 or more than one slave SPI device 504), a search for a checksum match of the received data can be performed with at least a subset of the expected data.

It should be understood that SPI bus system 500 described herein is just one specific example of an SPI bus system that can be implemented using embodiment side band data embedding techniques, and is just one example of an embodiment full-duplex communications system. For example, embodiment systems and methods could be applied to other serial bus protocols such as UART, IBCB and the like, or to parallel bus protocols such as advanced microcontroller bus architecture (AMBA) and the like and/or to a combination of serial and parallel bus structures, such as a pipelined bus structure.

Figure 6A:
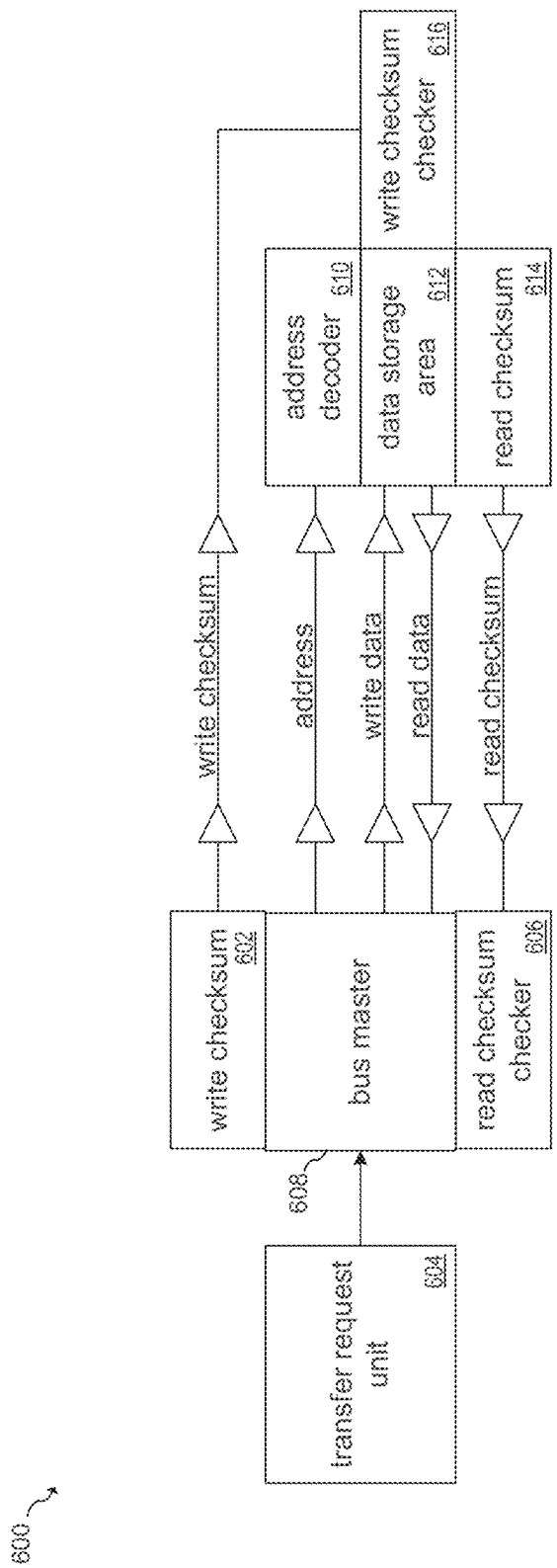
FIG. 6A illustrates a block diagram of a bus-master-based parallel bus system.

For example, FIG. 6A illustrates a bus-master-based parallel bus system 600 according to an embodiment of the present invention. Such a system can be used to implement the data paths of CPUs and DMA engines in microcontrollers for safety-related applications that also provide internal protection mechanisms. These internal protection mechanisms facilitate error detection if a transfer of data between two locations inside the µC is corrupted. Thus, if a data transfer is found to be corrupted, the corrupted data may be discarded and execution avoided.

As shown, parallel bus system 600 includes a bus master 608 that controls access to the parallel bus that includes data lines that facilitate the transfer of a write checksum, a read checksum, an address, write data and read data. During operation another unit within the system (which is represented in FIG. 6A as transfer request unit 604) may request a data transfer from bus master 608. Bus master 608 either issues a write command (from the bus master 608 to a location in data storage area 612) or a read command (from a location in data storage area 612 to bus master 608). In various embodiments, data storage area 612 may be implemented using any type of element or data storage circuit that stores information, such as, but not limited to RAM, non-volatile memory (NVM), flip-flops, registers and/or latches and may contain several data storage elements.

Address decoder 610 produces a decoded read or write address that selects a specific location from data storage area 612 to activate the read action or the write action. If an error occurs in the path between transfer request unit 604, bus master 608, the bus structure itself, and address decoder 610, it may be very difficult or impossible to check whether the data is written to or read from the correct data storage element in a conventional parallel bus system. Thus, in embodiments of the present invention, embodiment data embedding techniques can be used to detect errors in the transmission, storing and reading of data within parallel bus system 600 through the use of a transmitted write data check field such as write checksum and/or a read data check field such as a read checksum. In one embodiment, the read or write address may be coded as a first binary value, whereas the decoded read or write address or parts of it may be coded as a second binary value with a different size. In another embodiment, the decoded read or write address or parts of it may be represented by individual selection signals for each storage element (or a set of storage elements), also known as 1-out-of-N coding or HOT-ONE coding. The decoded address represents a selection of the storage element and can be seen as a unique storage element identifier, where "unique" may apply to the complete address range of a device or at least to a subset of addresses.

In an embodiment, the validity of a data read from data storage area 612 to bus master 608 is verified by having read checksum generator 614 generate a checksum that is based on the data read from data storage area 612 and on a decoded read address or storage element identifier produced by address decoder 610. Read checksum checker 606 coupled to bus master 608 verifies the read checksum based on the received data, the received read checksum, and a predetermined and/or locally stored version of the expected decoded address or storage element identifier. Thus, any failure or corruption in the transmission of the read data and/or address decoder 610 can be detected by read checksum checker 606. Once the error is detected, the associated data can be discarded and/or transfer request unit 604 can be notified of the failed read operation.

Similarly, the validity of a data written from bus master 608 to data storage area 612 is verified by having write checksum unit 602 generate a checksum (also referred to as a first write data check field) that is based on the data requested by bus master 608 to be written to data storage area 612 and on an expected decoded address produced by address decoder 610 or the storage element identifier. Write checksum checker 616 coupled to data storage area 612 produces an internally generated checksum based on the data intended to be written to data storage area 612 and the address decoded by address decoder 610 or the storage element identifier. In some embodiments, the register or location of data storage area 612 to which the data was written is read out as verification data via a read operation for the purpose of generating the internally generated checksum, which can also be referred to as a second write data check field. If the internally generated checksum matches the checksum received from write checksum unit 602, then the data is considered valid. Otherwise the data is not transmitted to bus master 608 and/or bus master 608 is notified of the error. In some embodiments, an acknowledgement message is sent to bus master 608 to confirm that the data was successfully written to data storage area 612.

Figure 6B:
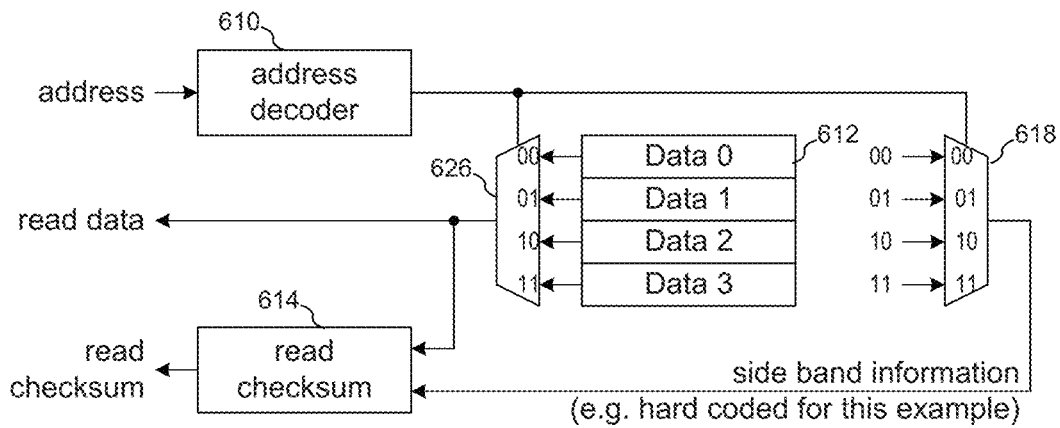
FIGS. 6B-6D illustrate block diagrams that show data verification circuitry for the bus-master-based parallel bus system.

FIG. 6B shows a functional block diagram that illustrates the operation of a read operation for parallel bus system 600. During operation, address decoder 610 receives a read address from the bus and decodes the address. The decoded address (or the related storage element identifier) is used to read data from the corresponding memory location in data storage area 612. This read operation is represented by data multiplexer 626. The decoded address and the read data is then used by read checksum generator 614 to generate a checksum that is transmitted over the bus. In some embodiments the side band information used by read checksum generator 614 is produced using address decoder test multiplexer 618 based on the decoded address produced by address decoder 610. The value delivered by multiplexer 618 may be interpreted as a storage element identifier for the source of the data (in FIG. 6B) or for the target of the data (in FIG. 6C). In various embodiments, address decoder test multiplexer 618 is configured to map the output of address decoder 610 to a digital word representative of the decoded address. In some embodiments, this digital word may contain fewer bits than the decoded address produced by address decoder 610. In alternative embodiments, address decoder test multiplexer 618 may be implemented using a memory, a lookup table, and/or any digital circuit that can map a first digital word into a second digital word. In further alternative embodiments, address decoder test multiplexer 618 may be omitted and the read checksum is generated based on the read data and the decoded address directly. In some embodiments, read checksum generator 614 is implemented according to embodiment data check combiners described hereinabove with respect to FIGS. 3A-3C. Read checksum checker 606 coupled to bus master 608 verifies the read checksum produced by read checksum generator 614 in order to determine whether the received read data is valid. If the read data is not determined to be valid, then the data is deemed to be corrupted. Thus data may be discarded and/or transfer request unit 604 (or other system component) may be notified of the read failure.

Figure 6C:
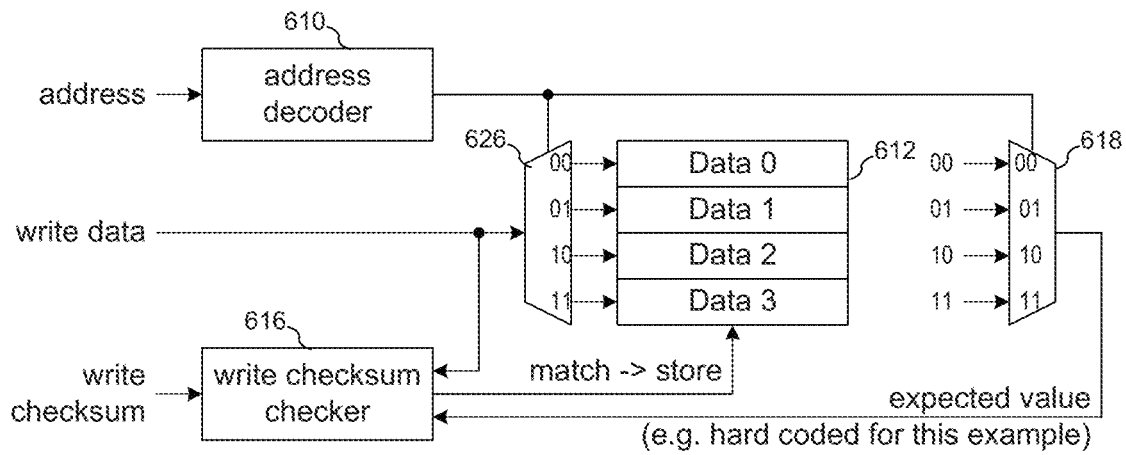

FIG. 6C shows a functional block diagram that illustrates the operation of a write operation for parallel bus system 600. During operation, address decoder 610 receives a write address from the bus and decodes the address. The decoded address is used to write data to the corresponding memory location in data storage area 612 if the data is considered valid. Write checksum checker 616 compares the write checksum received from write checksum unit 602 and compares the received write checksum to a locally generated checksum. If the internally generated checksum matches the received write checksum, then the requested write data is stored in data storage area 612. Otherwise, the data is discarded and/or an error message is sent to write bus master 608.

Figure 6D:
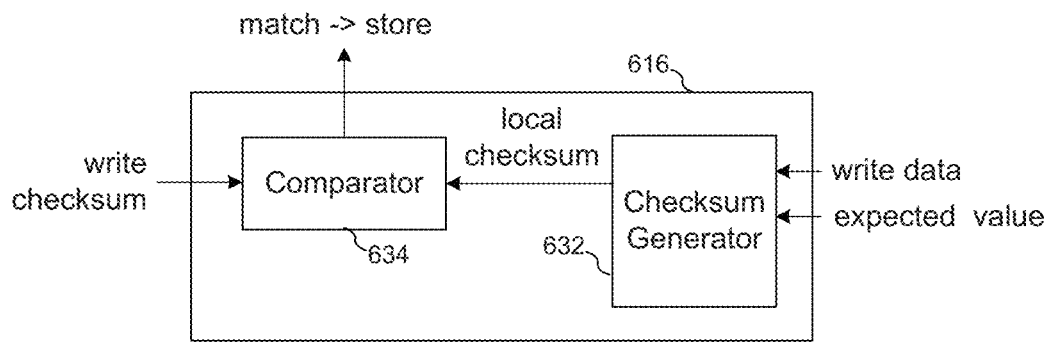

FIG. 6D illustrates a block diagram of one embodiment implementation of write checksum checker 616. As shown, write checksum checker 616 includes internal checksum generator 632 coupled to comparator 634. In an embodiment, internal checksum generator 632 produces a local checksum based on the write data received from bus master 608, the expected value produced by address decoder test multiplexer 618 (that is based on the decoded address produced by address decoder 610). In various embodiments the circuitry and/or algorithm used to produce by local checksum is identical to the circuitry and/or algorithm used by write checksum unit 602 to produce the write checksum received by write checksum checker 616. During operation, comparator 634 compares the locally generated checksum to the received write checksum generated by write checksum unit 602. If the two values match, then the write operation is considered to be valid. If the two values do not match, then the write operation is considered to be unsuccessful.

While the embodiment of FIGS. 6A-6D is specifically directed to a bus-master-based parallel bus system, it should be understood that embodiment systems and methods could be directed to other parallel bus systems and/or any data system that utilizes a parallel data bus.

Example embodiments of the present invention are summarized here. Other embodiments can also be understood from the entirety of the specification and the claims filed herein.

Example 1. A method of transferring data, the method including: determining, by a first device, a data check field of a data frame based on a predetermined identification field and a plurality of data bits, where the predetermined identification field represents at least one of a content, source or target of the plurality of data bits; and transmitting, by the first device to a second device, the data frame including the plurality of data bits and the data check field without directly transmitting the predetermined identification field.

Example 2. The method of example 1, where the source of the plurality of data bits is based on a decoded read address.

Example 3. The method of one of examples 1 or 2, where the target of the plurality of data bits is based on a decoded write address.

Example 4. The method of one of examples 1 to 3, where the source of the plurality of data bits is based on a device identifier of the first device or an address of the first device.

Example 5. The method of one of examples 1 to 4, where determining the data check field includes applying a hash function to the predetermined identification field and the plurality of data bits to produce the data check field.

Example 6. The method of one of examples 1 to 5, where determining the data check field includes: performing a reversible operation with the plurality of data bits and the predetermined identification field to produce a first data value; and applying a hash function to the first data value to produce the data check field.

Example 7. The method example 6, where the reversible operation includes an exclusive-OR operation; and applying the hash function includes calculating a cyclic redundancy checksum from the plurality of data bits.

Example 8. The method of one of examples 1 to 7, where determining the data check field includes: applying a hash function to the plurality of data bits to produce a first checksum; and performing a reversible operation with the first checksum and the predetermined identification field to produce the data check field.

Example 9. The method of one of examples 1 to 8, where the predetermined identification field includes a write address to which first received data is written.

Example 10. The method of example 9, further including receiving, by the second device, the first received data and the write address from the first device before determining the data check field.

Example 11. The method of example 10, where the first received data includes a plurality of data words and the write address includes a plurality of write addresses.

Example 12. The method of one of examples 1 to 11, further including: receiving, by the second device, the plurality of data bits and the data check field from the first device; and determining, by the second device, the predetermined identification field by verifying the data check field based on the received plurality of data bits and a locally stored version of the predetermined identification field.

Example 13. A circuit configured to be coupled to a bus, the circuit including: a first circuit configured to determine a data check field of a data frame based on a predetermined identification field and a plurality of data bits, where the predetermined identification field represents at least one of a content, source or target of the plurality of data bits; and a transmitter coupled to the first circuit and configured to be coupled to the bus and to transmit to a second circuit the data frame including the plurality of data bits and the data check field without directly transmitting the predetermined identification field.

Example 14. The circuit of example 13, where the first circuit and the transmitter are disposed on a battery cell integrated circuit configured to be coupled to a battery cell, and where the second circuit is a host controller.

Example 15. The circuit of one of examples 13 or 14, where the bus includes a serial bus.

Example 16. The circuit of one of examples 13 to 15, where the source of the plurality of data bits is based on a decoded read address.

Example 17. The circuit of one of examples 13 to 16, where the target of the plurality of data bits is based on a decoded write address.

Example 18. The circuit of one of examples 13 to 17, where the source of the plurality of data bits is based on a device identifier of the first circuit or an address of the first circuit.

Example 19. The circuit of example 18, where the first circuit is configured to determine the data check field by applying a hash function to the predetermined identification field and the plurality of data bits to produce the data check field.

Example 20. The circuit of one of examples 13 to 19, where the first circuit is configured to determine the data check field by: performing a reversible operation with the plurality of data bits and the predetermined identification field to produce a first data value; and applying a hash function to the first data value to produce the data check field.

Example 21. The circuit of one of examples 13 to 20, where the first circuit is configured to determine the data check field by: applying a hash function to the plurality of data bits to produce a first checksum; and performing a reversible operation with the first checksum and the predetermined identification field to produce the data check field.

Example 22. The circuit of one of examples 13 to 21, where the second circuit is configured to be coupled to the bus and includes a receiver configured to receive the plurality of data bits and the data check field from the transmitter, where the second circuit is configured to determine the predetermined identification field by verifying the data check field based on the received plurality of data bits and a locally stored version of the predetermined identification field.

Example 23. The circuit of example 22, where the transmitter, receiver, first circuit and second circuit are disposed on a monolithic semiconductor circuit.

Example 24. A method of operating an integrated circuit, the method including: performing a read operation including receiving a read address on a bus, decoding the received read address to produce a decoded read address, accessing data based on the decoded read address, producing a read data check field based on the accessed data and the decoded read address, and transmitting the read data check field on the bus.

Example 25. The method of example 24, further including: performing a write operation including receiving a write address, write data, and a first write data check field from the bus, decoding the received write address to produce a decoded write address, selecting a write location based on the decoded write address, reading verification data based on the decoded write address before writing the write data, producing a second write data check field based on the decoded write address and the verification data, and comparing the first write data check field to the second write data check field, and write the write data to the selected location if the compare action delivers a match.

Example 26. The method of example 25, further including transmitting an acknowledgement message to the bus when the first write data check field matches the second write data check field based on the comparing.

Example 27. The method of one of examples 25 or 26, where writing the write data includes selecting a first register; and reading the verification data includes reading the verification data from the first register.

Example 28. The method of one of examples 25 to 27, further including: requesting the write operation including determining the first write data check field based on the write address and the write data, and transmitting the write address, the write data and the first write data check field to the bus.

Example 29. The method of one of examples 24 to 28, further including: requesting the read operation including transmitting the read address on the bus, receiving the accessed data and a read data check field from the bus, and verifying the read data check field from the bus based on received accessed data and the transmitted read address.

Example 30. The method of one of examples 24 to 29, where producing the read data check field includes: applying a hash function to the accessed data to produce a first checksum, and performing a reversible operation with the first checksum and the decoded read address to form the read data check field.

Example 31. The method of example 30 where the reversible operation includes an exclusive-OR operation; and where applying the hash function includes calculating a cyclic redundancy checksum from the accessed data.

Example 32. The method of one of examples 24 to 31, where producing the read data check field includes mapping the decoded read address to a digital word representative of the decoded address and producing a read data check field based on the accessed data and the digital word representative of the decoded address.

Example 33. The method of example 32, where mapping the decoded read address to the digital word representative of the decoded address includes using a multiplexer.

Example 34. An integrated circuit including: a bus; a bus master circuit coupled to the bus; and a data storage circuit coupled to the bus, the data storage circuit including a data storage area, an address decoder, and a read checksum generator, the data storage circuit configured to receive a read address from the bus, decode, by the address decoder, the received read address to produce a decoded read address, access data from the data storage area based on the decoded read address, produce, by the read checksum generator, a read data check field based on the accessed data and the decoded read address, and transmit the read data check field on the bus without directly transmitting the decoded read address.

Example 35. The integrated circuit of example 34, where the data storage circuit further includes a write checksum circuit, and the data storage circuit is further configured to: receive a write address, write data, and a first write data check field from the bus, decode, using the address decoder, the received write address to produce a decoded write address, select the data storage area based on the decoded write address, read verification data from the selected data storage area based on the decoded write address after writing the write data, produce, using the write checksum circuit, a second write data check field based on the decoded write address and the verification data, compare, using the write checksum circuit, the first write data check field to the second write data check field, and write the write data to the selected data storage area if the first write data check field matches the second write data check field.

Example 36. The integrated circuit of one of examples 34 or 35, where the data storage circuit is further configured to transmit the accessed data on the bus.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating an integrated circuit, the method comprising:
   performing a read operation comprising
      receiving a read address on a bus,
      decoding the received read address to produce a decoded read address, wherein the decoded read address comprises one or more hardware selection signals;
      accessing data from a memory location using the one or more hardware selection signals of the decoded read address,
      producing a read data check field based on the accessed data and the one or more hardware selection signals of the decoded read address, and
      transmitting the read data check field on the bus.

2. The method of claim 1, further comprising:
   performing a write operation comprising
      receiving a write address, write data, and a first write data check field from the bus,
      decoding the received write address to produce a decoded write address,
      selecting a write location based on the decoded write address, reading verification data based on the decoded write address before writing the write data,
producing a second write data check field based on the decoded write address and the verification data, and
comparing the first write data check field to the second write data check field, and write the write data to the selected write location when the first write data check field matches the second write data check field based on the comparing.

3. The method of claim 2, further comprising transmitting an acknowledgement message to the bus when the first write data check field matches the second write data check field based on the comparing.

4. The method of claim 2, wherein:
writing the write data comprises selecting a first register; and
reading the verification data comprises reading the verification data from the first register.

5. The method of claim 2, further comprising:
requesting the write operation comprising
determining the first write data check field based on the write address and the write data, and
transmitting the write address, the write data and the first write data check field to the bus.

6. The method of claim 1, further comprising:
requesting the read operation comprising
transmitting the read address on the bus,
receiving the accessed data and the read data check field from the bus, and
verifying the read data check field from the bus based on received accessed data and the transmitted read address.

7. The method of claim 1, wherein producing the read data check field comprises:
applying a hash function to the accessed data to produce a first checksum, and
performing a reversible operation with the first checksum and the decoded read address to form the read data check field.

8. The method of claim 7, wherein the reversible operation comprises an exclusive-OR operation; and
wherein applying the hash function comprises calculating a cyclic redundancy checksum from the accessed data.

9. The method of claim 1, wherein producing the read data check field comprises mapping the one or more hardware selection signals of the decoded read address to a digital word representative of the one or more hardware selection signals of the decoded read address and producing the read data check field based on the accessed data and the digital word representative of the one or more hardware selection signals of the decoded read address.

10. The method of claim 9, wherein mapping the one or more hardware selection signals of the decoded read address to the digital word representative of the one or more hardware selection signals of the decoded read address comprises using a multiplexer.

11. The method of claim 1, wherein the one or more hardware selection signals comprise 1-out-of-N coded individual selection signals.

12. The method of claim 1, wherein:
the hardware selection signals comprise multiplexer selection signals; and
accessing the data from the memory location using the one or more hardware selection signals of the decoded read address comprises applying the multiplexer selection signals to a multiplexer coupled to the memory location.

13. A battery monitoring system comprising:
a plurality of battery monitoring circuits, each of the plurality of battery monitoring circuits configured to be coupled to a respective battery cell of a battery stack and comprising:
a data circuit configured to calculate a data check field of a data frame from a predetermined identification field and a plurality of data bits, wherein the predetermined identification field represents at least one of a content, source or target of the plurality of data bits; and
a transmitter coupled to the data circuit and configured to transmit the data frame to a host controller via a bus without directly transmitting the predetermined identification field, wherein the data frame comprises the plurality of data bits and the data check field.

14. The battery monitoring system of claim 13, further comprising the host controller, wherein:
the host controller comprises a receiver configured to receive the plurality of data bits and the data check field from the transmitter via the bus; and
the host controller is configured to determine the predetermined identification field by verifying the data check field based on the received plurality of data bits and a locally stored version of the predetermined identification field.

15. The battery monitoring system of claim 14, further comprising the battery stack.

16. The battery monitoring system of claim 13, wherein the plurality of data bits comprises a voltage measurement of the respective battery cell.

17. The battery monitoring system of claim 13, wherein the data circuit is configured to calculate the data check field by:
performing a reversible operation with the plurality of data bits and the predetermined identification field to produce a first data value; and
applying a hash function to the first data value to produce the data check field.

18. The battery monitoring system of claim 13, wherein the data circuit is configured to determine the data check field by:
applying a hash function to the plurality of data bits to produce a first checksum; and
performing a reversible operation with the first checksum and the predetermined identification field to produce the data check field.

19. The battery monitoring system of claim 13, wherein the plurality of battery monitoring circuits are daisy chained together via interconnecting portions of the bus.

20. A method of monitoring a battery, the method comprising:
storing battery sensing data in a register;
receiving a read request from a host controller;
calculating a data check field of a data frame from a predetermined identification field and the stored battery sensing data, wherein the predetermined identification field represents at least one of a content, source or target of the plurality of the battery sensing data; and
in response to the read request, transmitting the data frame to the host controller via a bus without directly transmitting the predetermined identification field, wherein the data frame comprises the battery sensing data and the data check field.

21. The method of claim 20, wherein the predetermined identification field comprises at least one of a node ID of a battery monitoring circuit or an address of the register.

22. The method of claim 20, wherein the battery sensing data comprises a measured battery voltage.

* * * * *